United States Patent
Shaw et al.

(10) Patent No.: US 7,206,889 B2
(45) Date of Patent: Apr. 17, 2007

(54) SYSTEMS AND METHODS FOR ENABLING COMMUNICATIONS AMONG DEVICES IN A MULTI-CACHE LINE SIZE ENVIRONMENT AND DISABLING COMMUNICATIONS AMONG DEVICES OF INCOMPATIBLE CACHE LINE SIZES

(75) Inventors: Mark E. Shaw, Garland, TX (US); Gary B. Gostin, Plano, TX (US); Lisa Heid Pallotti, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 197 days.

(21) Appl. No.: 11/085,883

(22) Filed: Mar. 22, 2005

(65) Prior Publication Data

US 2006/0218348 A1 Sep. 28, 2006

(51) Int. Cl.
*G06F 12/00* (2006.01)
*G06F 13/00* (2006.01)
*G06F 13/16* (2006.01)

(52) U.S. Cl. ...................................... 710/317; 711/118
(58) Field of Classification Search .................. 710/20, 710/60, 307, 305, 7, 100, 38, 21, 313, 4, 710/316, 317; 711/137, 145, 118, 100, 154, 711/133, 159; 709/213, 301; 713/100; 370/351, 370/362, 912
See application file for complete search history.

(56) References Cited

U.S. PATENT DOCUMENTS

| 5,598,568 | A | 1/1997 | Frisch | |
|---|---|---|---|---|
| 6,070,200 | A * | 5/2000 | Gates et al. | 710/20 |
| 6,279,087 | B1 * | 8/2001 | Melo et al. | 711/146 |
| 6,292,705 | B1 | 9/2001 | Wang et al. | |
| 6,298,417 | B1 * | 10/2001 | Chan et al. | 711/143 |
| 6,466,825 | B1 | 10/2002 | Wang et al. | |
| 6,510,475 | B1 * | 1/2003 | Bennett | 710/60 |
| 6,553,435 | B1 * | 4/2003 | Normoyle et al. | 710/22 |
| 6,553,446 | B1 * | 4/2003 | Miller | 710/307 |
| 6,581,124 | B1 * | 6/2003 | Anand | 710/305 |
| 6,751,698 | B1 | 6/2004 | Deneroff et al. | |
| 6,760,818 | B2 * | 7/2004 | van de Waerdt | 711/137 |
| 6,898,734 | B2 * | 5/2005 | Kapoor et al. | 714/25 |
| 2006/0218348 | A1 * | 9/2006 | Shaw et al. | 711/118 |

OTHER PUBLICATIONS

"Line size adaptivity analysis of parameterized loop nests for direct mapped data cache" by D'Alberto et al. (abstract only) Publication Date: Feb. 2005.*

\* cited by examiner

*Primary Examiner*—Gopal C. Ray

(57) ABSTRACT

A system and method for facilitating communications between a plurality of devices that communicate using different cache-line sizes are disclosed. Briefly described, in architecture, one exemplary embodiment of a compatible cache-line communication system employs a plurality of first ports, each first port configured to receive communications from a first type of device that uses a first cache-line size; and a plurality of second ports, each second port configured to receive communications from a second type of device that uses a second cache-line size, such that communications between the first type of devices are enabled over a plurality of first routes, such that communications between the second type of devices are enabled over a plurality of second routes, and such that communications between the first type of devices and the second type of devices are disabled.

22 Claims, 6 Drawing Sheets

FIG. 3
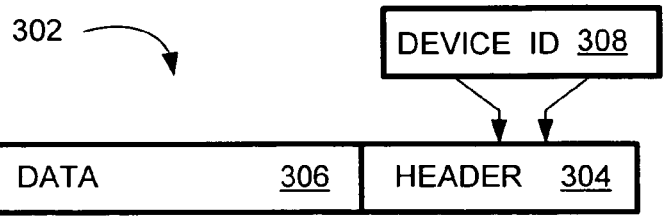
FIG. 4
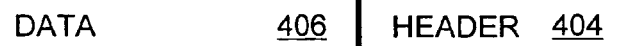
FIG. 5
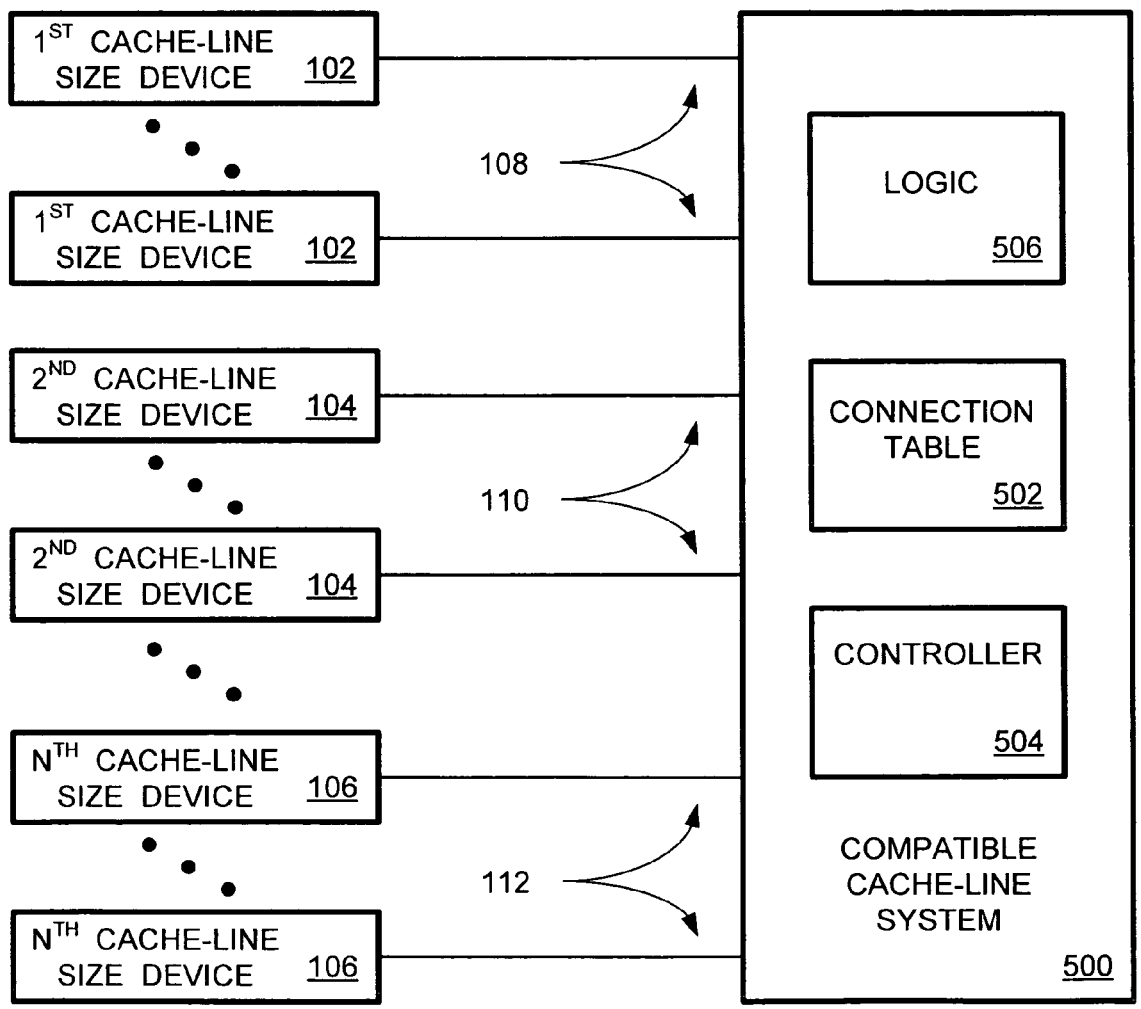

SYSTEMS AND METHODS FOR ENABLING COMMUNICATIONS AMONG DEVICES IN A MULTI-CACHE LINE SIZE ENVIRONMENT AND DISABLING COMMUNICATIONS AMONG DEVICES OF INCOMPATIBLE CACHE LINE SIZES

BACKGROUND

Multi-processor systems, such as a symmetric multiprocessing (SMP) system, employ many parallel-operating central processing units (CPUs) which independently perform tasks under the direction of a single operating system. One type of multi-processor system is based upon a plurality of CPUs employing high-bandwidth point-to-point links (rather than a conventional shared-bus architecture) to provide direct connectivity between the CPU and to input/output (I/O) devices, memory units and/or other CPUs.

When tasks of a running application are being performed by a plurality of the multi-processor system CPUs, individual CPUs may perform various operations that require communication of information to other devices. For example, the information may be stored to a remote memory or communicated to other CPUs.

In some multi-processor systems it is desirable to use different types of CPUs. For example, a first type of CPU may be selected for performing a particular type of task for which it is well suited for, while a second type of CPU may be selected for performing another type of task for which it is well suited for.

When different types of CPUs are employed in a multiple CPU-based system, the CPUs may communicate with each other and/or communicate to other devices. As long as the CPUs and other devices, and the connecting system which couples the CPUs and the devices together, "speak" the same language, the multi-processor system will work seamlessly.

However, it is often the case that a multi-processor system will use components, such as the CPUs and/or other devices, that do not "speak" the same language. One variation between such devices occurs in the size of the cache-lines used by the various components. For example, some devices may operate under a 64 byte cache-line architecture, and other devices may operate under a 128 byte cache-line architecture. Such devices operating under different cache-line architectures can not directly communicate with each other.

Some systems solve such discrepancies between cache-line sizes by formatting data communications into a common cache-line size. Or, selected devices may be configured to convert their cache-line size to conform with a preselected standard cache-line size for the multiprocessor system architecture in which the components are deployed into. However, such solutions require extra processing power and/or time, thereby degrading the operating efficiency of the multiprocessor system.

SUMMARY

One embodiment of a compatible cache-line communication system may comprise a plurality of first ports, each first port configured to receive communications from a first type of device that uses a first cache-line size; and a plurality of second ports, each second port configured to receive communications from a second type of device that uses a second cache-line size, such that communications between the first type of devices are enabled over a plurality of first routes, such that communications between the second type of devices are enabled over a plurality of second routes, and such that communications between the first type of devices and the second type of devices are disabled.

Another embodiment is a method for facilitating communications between a plurality of devices that communicate using different cache-line sizes, the method comprising determining the cache-line size of a first device, determining the cache-line size of a second device, and enabling a communication route between the first device and the second device when the determined cache-line sizes correspond.

BRIEF DESCRIPTION OF THE DRAWINGS

The components in the drawings are not necessarily to scale relative to each other. Like reference numerals designate corresponding parts throughout the several views.

FIG. 3 illustrates a simplified communication that is evaluated by one embodiment of a compatible cache-line system.

FIG. 4 illustrates a simplified communication that is evaluated by another embodiment of a compatible cache-line system.

FIG. 5 is a simplified block diagram illustrating an embodiment of a table-based compatible cache-line system facilitating communications between devices communicating with different cache-line sizes.

DETAILED DESCRIPTION

Figure 1:
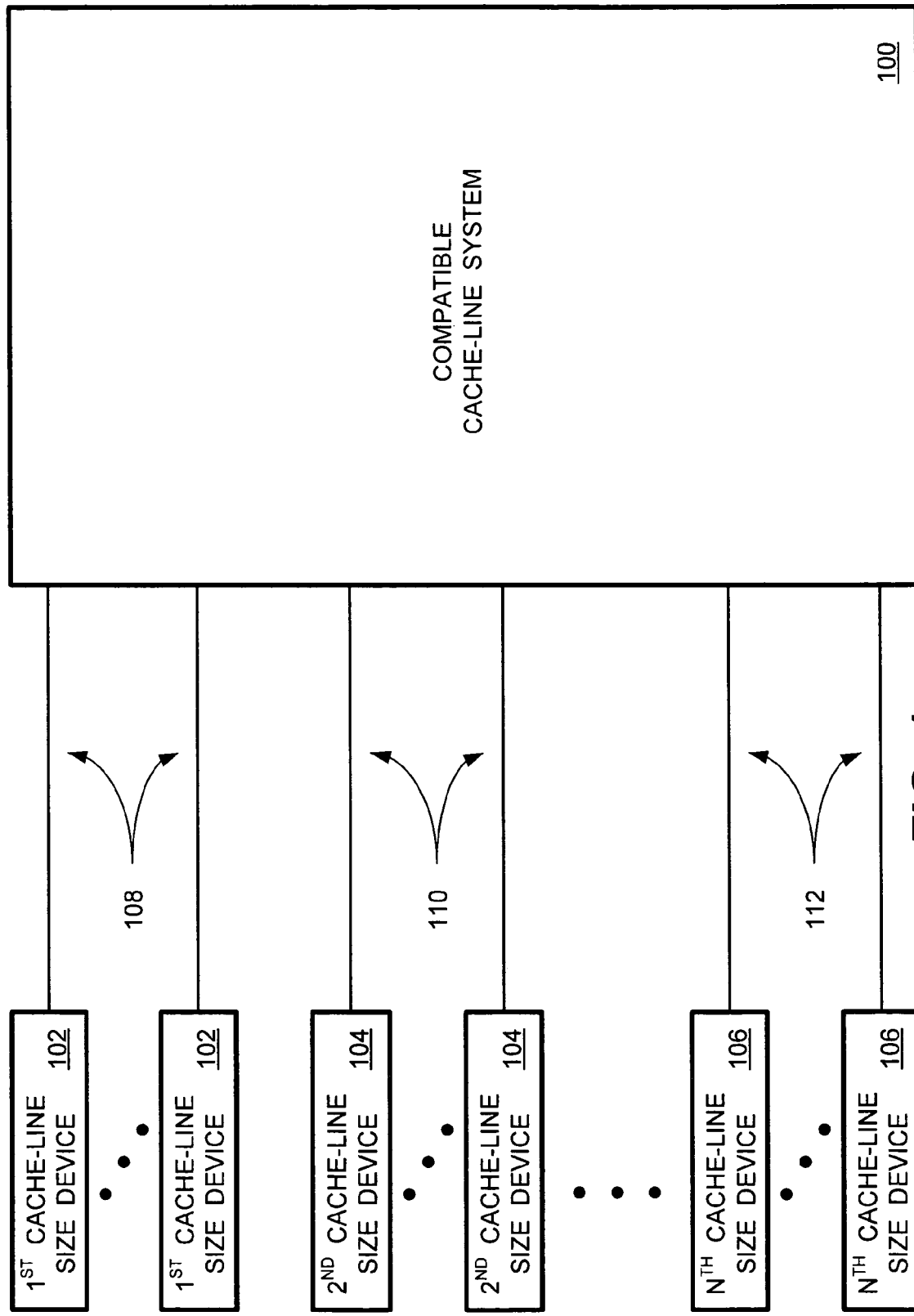
FIG. 1 is a block diagram illustrating a compatible cache-line system embodiment.

FIG. 1 is a block diagram illustrating a compatible cache-line communication system 100 embodiment. The compatible cache-line communication system 100 provides a system and method for facilitating communications between a plurality of devices that communicate using different cache-line sizes. Embodiments of the compatible cache-line communication system 100 communicatively couple the different cache-line size devices 102, 104, 106 together. Components residing in the compatible cache-line communication system 100 may be similar to crossbars or other network switch devices. The compatible cache-line communication system 100 embodiments ensure that communications between the various devices 102, 104, 106 of a symmetric multiprocessing (SMP) system communicate with each other using compatible cache-line sizes.

For example, devices 102 communicate using a $1^{st}$ cache-line size. Devices 102 are coupled to the compatible cache-line communication system 100 via connections 108. Similarly, devices 104 communicate using a $2^{nd}$ cache-line size and are coupled to the compatible cache-line communication system 100 via connections 110. Many different cache-line size devices may be coupled to embodiments of a compatible cache-line communication system 100. For example, illustrated are devices 106 that communicate using an $N^{th}$ cache-line size and are coupled to the compatible cache-line communication system 100 via connections 112.

As will be described in greater detail below, communications occurring over connections 108 are limited to the $1^{st}$ cache-line size. Similarly, communications occurring over connections 110 are limited to the $2^{nd}$ cache-line size and communications occurring over connections 112 are limited to the $N^{th}$ cache-line size.

It is appreciated that the devices 102 are illustrated as being grouped proximally together for convenience. For example, an SMP system may have a plurality of processor clusters that each have a plurality of processors. Thus, devices 102 may all reside in one processor cluster, and/or devices 102 may reside in a processor cluster with other devices that use different cache-line sizes. The devices may also reside in different processor clusters, and/or reside separately from processor clusters (in other systems or as stand-alone devices). Similarly, devices 104 and 106 are illustrated as being grouped proximally together for convenience.

Figure 2:
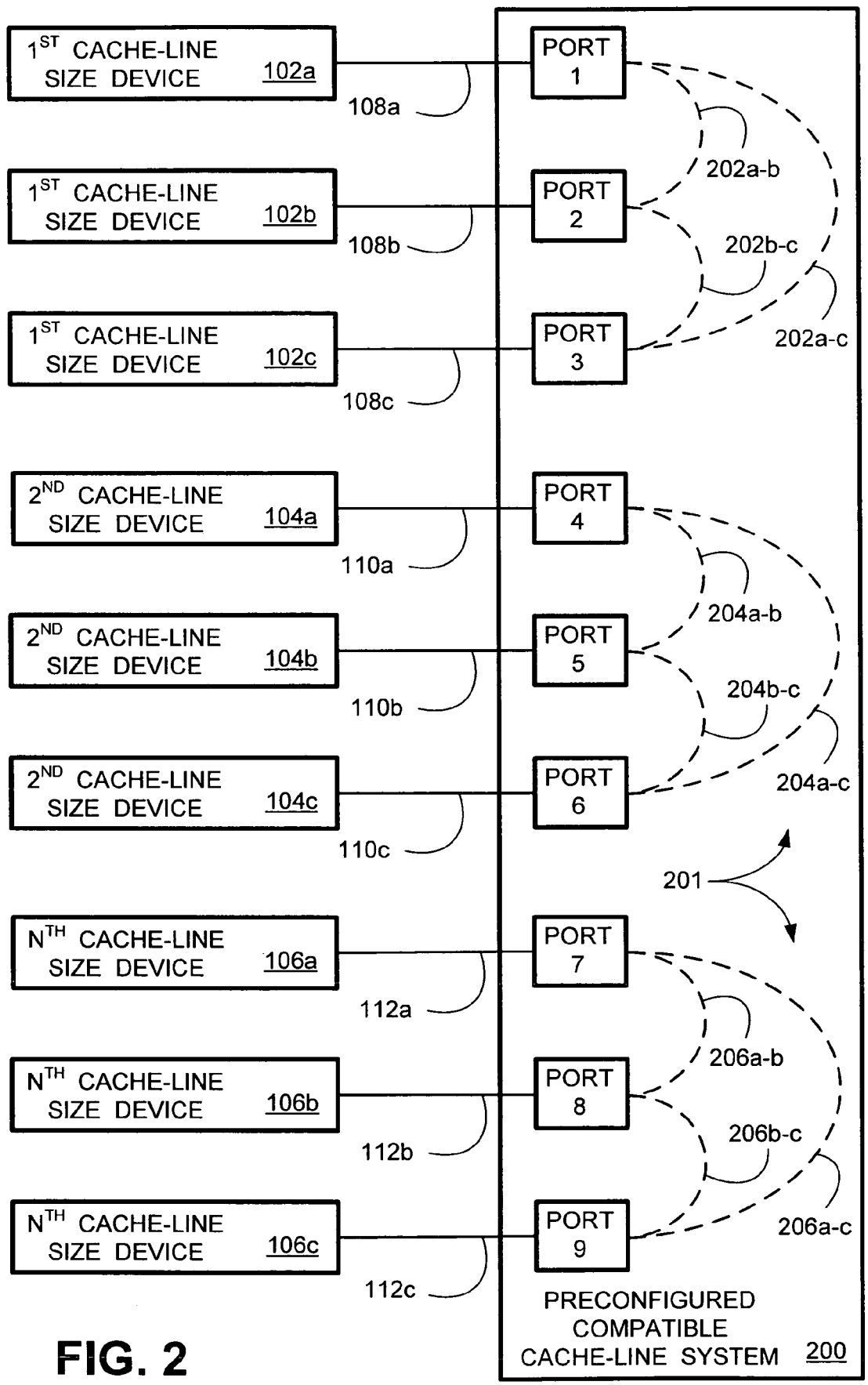
FIG. 2 is a block diagram illustrating a first embodiment of a preconfigured compatible cache-line system facilitating communications between devices communicating with different cache-line sizes.

FIG. 2 is a block diagram illustrating a first embodiment of a preconfigured compatible cache-line system 200 facilitating communications between devices communicating with different cache-line sizes. In this exemplary embodiment, the preconfigured compatible cache-line system 200 is implemented in a single crossbar or other network switch device that is preconfigured prior to being implemented in a system. That is, routes are enabled/disabled before devices attempt to communicate with each other.

The preconfigured compatible cache-line system 200 has a plurality of internal communication paths 201 between the ports 1–9. Communication paths are enabled only between devices that use the same cache-line size. There are no communication paths between devices that use different cache-line sizes. Communication paths may be disabled prior to use, or may be omitted during fabrication based upon system design, depending upon the embodiment, such that devices using different cache-line sizes are not communicatively coupled together.

For example, devices 102a–c communicate using a $1^{st}$ cache-line size. Devices 102a and 102b are coupled to ports 1 and 2 of the compatible cache-line communication system 100, via connections 108a and 108b, respectively. Communication path 202a–b is coupled to port 1 and port 2. Accordingly, a route between devices 102a and 102b may be established (connection 108a, port 1, communication path 202a–b, port 2, and connection 108b) that communicatively couples devices 102a and 102b.

Similarly, devices 102a and 102c are coupled to ports 1 and 3 via connections 108a and 108c, respectively, such that a route may be established (connection 108a, port 1, communication path 202a–c, port 3, and connection 108c). Devices 102b and 102c are coupled to ports 2 and 3 via connections 108b and 108c, respectively, such that another route may be established (connection 108b, port 2, communication path 202b–c, port 3, and connection 108c). Thus, devices 102a–c, which communicate using a $1^{st}$ cache-line size, may be communicatively coupled together by the preconfigured compatible cache-line system 200.

Devices 104a–c communicate using a $2^{nd}$ cache-line size. Devices 104a–c are communicatively coupled together over communication paths 204a–b, 204a–c and 204b–c, as illustrated. A route between devices 104a and 104b may be established (connection 110a, port 4, communication path 204a–b, port 5, and connection 110b). Similarly, a route between devices 104a and 104c may be established (connection 110a, port 4, communication path 204a–c, port 6, and connection 110c), and a route between devices 104b and 104c may be established (connection 110b, port 5, communication path 204b–c, port 6, and connection 110c). Thus, devices 104a–c, which communicate using a $2^{nd}$ cache-line size, may be communicatively coupled together by the preconfigured compatible cache-line system 200.

Devices 106a–c communicate using an $N^{th}$ cache-line size. Devices 106a–c are communicatively coupled together over communication paths 206a–b, 206a–c and 206b–c, as illustrated. A route between devices 106a and 106b may be established (connection 112a, port 7, communication path 206a–b, port 8, and connection 112b). Similarly, a route between devices 106a and 106c may be established (connection 112a, port 7, communication path 206a–c, port 9, and connection 112c), and a route between devices 106b and 106c may be established (connection 112b, port 8, communication path 206b–c, port 9, and connection 112c). Thus, devices 106a–c, which communicate using an $N^{th}$ cache-line size, may be communicatively coupled together by the preconfigured compatible cache-line system 200.

In the above described embodiment of the preconfigured compatible cache-line system 200 illustrated in FIG. 2, devices 102a–c are not communicatively coupled to devices 104a–c or 106a–c. Similarly, devices 104a–c are not communicatively coupled to devices 106a–c. Therefore, the SMP system employing the preconfigured compatible cache-line system 200 will not have cache-line size communication problems because devices that use different cache-line sizes can not directly communicate with each other.

As a practical illustrative example, assume that the devices 102a and 102b are processors that communicate using a 128 byte cache-line size, assume that device 102c is a memory unit that communicates using a 128 byte cache-line size, and assume that device 104a is a processor that communicates using a 64 byte cache-line size. If processor 102a attempts to communicate with processor 102b, or attempts to communicate information to/from memory unit 102c, the preconfigured compatible cache-line system 200 enables the routes 202a–b or 202a–c, respectively. However, if processor 102a attempts to communicate with processor 104b using the 128 byte cache-line size, the communication will fail (if otherwise permitted by the preconfigured compatible cache-line system 200) because processor 104a communicates using a 64 byte cache-line size. Additional data processing would be required to successfully support communications between processors 102a and 104a. The preconfigured compatible cache-line system 200 prevents direct processor-to-processor communications between processors 102a and 104a because there is no established route between the two processors. Similarly, if processor 104a attempts to communicate with processor 102b, or attempts to communicate information to/from memory unit 102c, the preconfigured compatible cache-line system 200 would prevent any direct device-to-device communications between processor 104a and processor 102b, or between processor 104a and memory unit 102c, because there is no established route between those devices.

It is appreciated that the communication paths 201 may comprise a plurality of components, not shown. In one embodiment, a crossbar is generally configured as described above, and an arbiter scheme enables the communication paths 201 as required to permit device-to-device communications. Thus, various embodiments may have other components not shown in FIG. 2.

For convenience, nine ports (ports 1–9) of the preconfigured compatible cache-line system 200 are illustrated in FIG. 2. In other embodiments, a different number of ports are provided. Three groups of devices (102a–c, 104a–c and 106a–c) using three different cache-line sizes were illustrated in FIG. 2. In other embodiments, communications between two groups of devices using two different cache-line sizes is provided. In yet other embodiments, communications between more that three groups of devices using more than three different cache-line sizes is provided.

Also, the three illustrated groups of devices (102a–c, 104a–c and 106a–c) had three devices per group. It is appreciated that the compatible cache-line communication system 100 (FIG. 1) can couple a group of two devices, up to groups of at least N-2 devices, that communicate using the same cache line size (where N equals the number of available ports, and wherein at least two remaining ports are used to communicatively couple other devices that use a different cache line size). In such a system, remaining ports are used to communicatively couple other groups of devices (wherein the other groups may have a different number of devices per group, and that communicate using a different cache line size).

In another embodiment of a compatible cache-line communication system 100, communicated data is evaluated to determine compatibility of the communications between a sending device and a receiving device. If the sending and receiving devices both use the same cache-line size, embodiments of the compatible cache-line communication system 100 permits (enables) the communication. However, if the sending and receiving devices use a different cache-line size, embodiments of the compatible cache-line communication system 100 prohibits (disables) the communication.

FIG. 3 illustrates a simplified communication that is evaluated by one embodiment of a compatible cache-line communication system 100 (FIG. 1). In this embodiment, information is communicated between devices as data packets 302. Data packet 302 includes at least a header 304 and data 306. The formatting of the data 306 is based upon the communicating device's cache-line size.

Header 304 includes a device identifier (ID) 308 that identified the sending device and the destination device (receiving device). An embodiment of the compatible cache-line communication system 100 identifies the sending device and the destination device, determines if the cache-line sizes are compatible (the same size), and if compatible, permits (enables) the communication of the data packet 302 between the sending device and the destination device. However, if the cache-line sizes are not compatible (different sizes), the compatible cache-line communication system 100 prohibits (disables) communications between the sending device and the destination device.

FIG. 4 illustrates a simplified communication that is evaluated by another embodiment of a compatible cache-line communication system 100 (FIG. 1). In this embodiment, information is communicated between devices as data packets 402. Data packet 402 includes at least a header 404 and data 406. As above, formatting of the data 406 is based upon the communicating device's cache-line size (the device that originated the communication).

In this embodiment, the data 406 includes the cache-line information 408 which enables the compatible cache-line communication system 100 to determine the cache-line size of the data. A predefined portion of the data, the cache-line information 408, may be used to specify cache-line size. Alternatively, the data itself may be evaluated in another embodiment to determine the cache-line size such that the cache-line information 408 is not required or used.

Accordingly, this embodiment determines the cache-line size, identifies the destination device, determines if the cache-line size of the data packet 402 is compatible (the same size as the cache-line size of the destination device), and if compatible, permits (enables) the communication of the data packet 402 between the sending device and the destination device. However, if the cache-line size of the data packet 402 is not compatible (a different size than the cache-line size of the destination device), the compatible cache-line communication system 100 prohibits (disables) communications between the sending device and the destination device.

FIG. 5 is a simplified block diagram illustrating an embodiment of a table-based compatible cache-line system 500 facilitating communications between devices communicating with different cache-line sizes. The table-based compatible cache-line system 500 has a connection table 502 that that has information identifying the cache-line size used by the receiving (destination) device and/or the transmitting (sending) device. Also included is a controller 504 that evaluates the communicated information, such as, but not limited to, the above-described data packets 302 and/or 402 (FIGS. 3 and 4). Controller 504 may be implemented using a processor-based system (processor 802, FIG. 8A), or may be implemented using a state machine-based system (state machine 804, FIG. 8B), or a combination system.

Logic 506 is retrieved and executed by controller 504 to perform the above-described enablement and/or disablement of routes by the various embodiments described herein. Logic 506, if used by an embodiment, may reside in any suitable storage medium (memory unit). For convenience, the logic 506 is illustrated as residing within the compatible cache-line system 500. In other embodiments, logic 506 may reside in a remote storage medium accessible by the controller 504.

Figure 6:
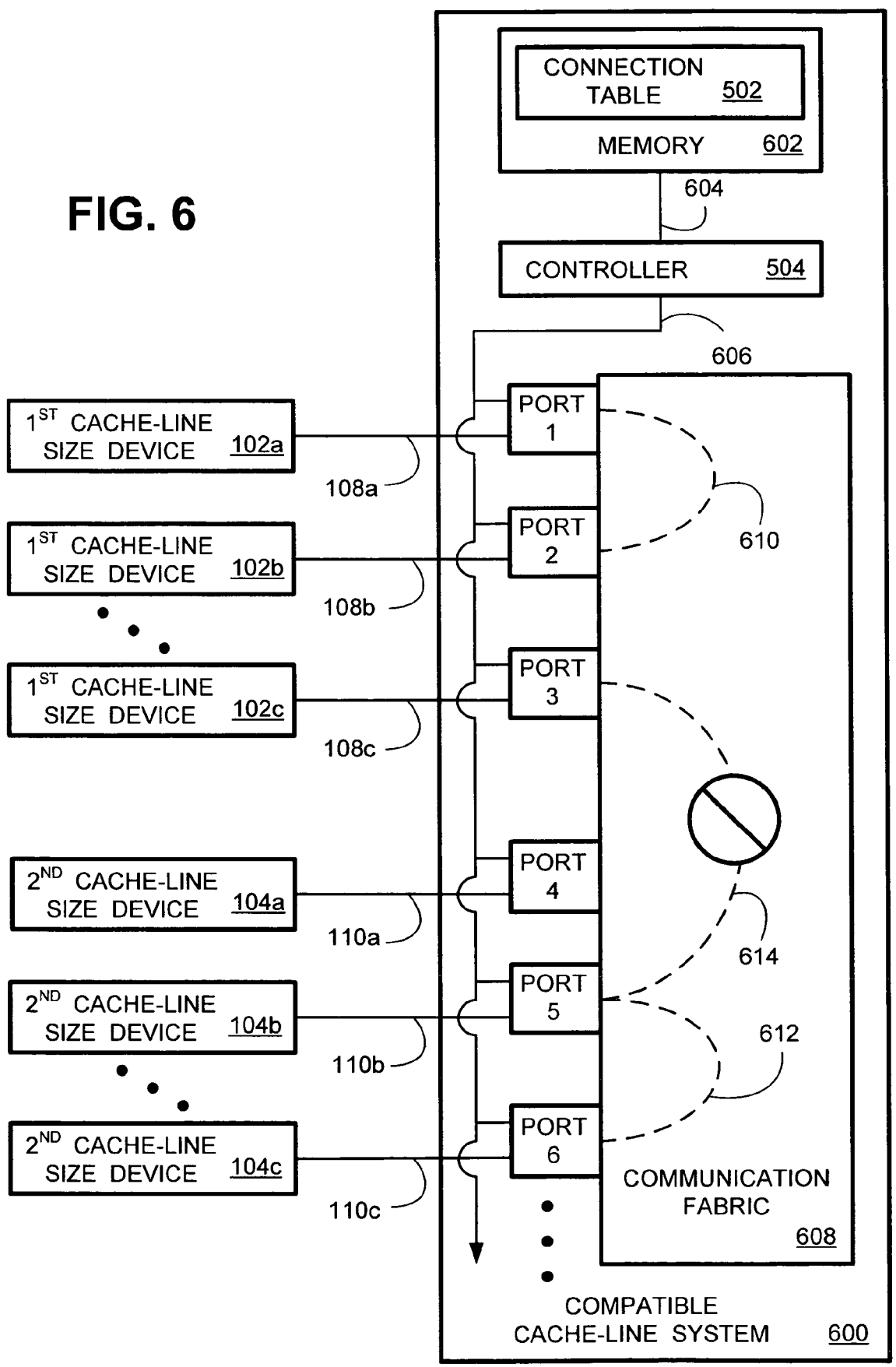
FIG. 6 is a block diagram illustrating greater detail of an embodiment of a table-based compatible cache-line system of FIG. 5.

FIG. 6 is a block diagram illustrating greater detail of an embodiment of a table-based compatible cache-line system 600. For convenience, six ports (ports 1–6) are illustrated. Ports 1–6 are communicatively coupled to devices 102a–c and to devices 104a–c, respectively. Devices 102a–c communicate using a $1^{st}$ cache-line size. Devices 104a–c communicate using a $2^{nd}$ cache-line size. As with the other above-described embodiments, a table-based compatible cache-line system 600 may employ any number of ports to facilitate communications between any number of devices that use different cache-line sizes.

Controller 504 is communicatively coupled to memory 602, via connection 604. Controller 504 is additionally coupled to ports 1–9, via connection 606. For convenience, connection 606 is illustrated as a single-line element, such as a communication bus or the like. Alternatively, connection 606 may be a plurality of individual elements that couple to the individual ports of the table-based compatible cache-line system 600. Accordingly, embodiments of controller 504 may communicate with ports 1–6 using any suitable formatted communication signal.

Ports 1–6 are communicatively coupled via communication fabric 608. Communication fabric 608 may have a variety of elements (not shown) such that ports may be communicatively coupled to each other. Components in the communication fabric 608 may include, but are not limited to, crossbars and/or other suitable network switch devices. Accordingly, the establishment of communication routes through the communication fabric 608 may be implemented by various components and/or processes. For example, one embodiment may employ an arbiter scheme and arbitrator devices, and routes would then be established based upon an arbitration process. Any suitable scheme of processes and/or devices may be used in the communication fabric 608, however, the controller 504 would operate such that communications between devices having compatible cache-line sizes are permitted (enabled), and would operate such that communications between devices that do not have compatible cache-line sizes are prevented (disabled).

Connectivity between ports 1–6 is based upon a determination of the compatibility of the communications between a sending device and a receiving device. This determination is made by controller 504 that analyzes the communicated information (for example, the contents of the above-described data packets 302 and/or 402 (FIGS. 3 and 4)). If the sending and receiving devices both use the same cache-line size, embodiments of the table-based compatible cache-line system 600 permits (enables) the communication. However, if the sending and receiving devices use a different cache-line size, embodiments of the table-based compatible cache-line system 600 prohibits (disables) the communication.

In one embodiment, controller 504 determines the identity of the sending and receiving devices, looks up their respective cache-lines sizes in the connection table 502, and evaluates the compatibility of the cache-line sizes used by the two devices. For example, the device ID 308 (FIG. 3) may be used to identify the sending and receiving devices.

In another embodiment, received information, for example a data packet 402, is analyzed to determine the cache-line size associated with the received information. Then, controller 504 looks up information in connection table 502 to determine if the cache-line size of the received information is compatible with the cache-line size of the receiving device.

For example, assume that device 102*a* needs to communicate with device 102*b*. Since device 102*a* and device 102*b* both use the $1^{st}$ cache-line size, controller 504 determines that the devices 102*a* and 102*b* have compatible cache-lines sizes, and enables a communication path 610 by communicating an enabling signal to port 1 and to port 2. Once port 1 and port 2 are enabled (other ports may be enabled and/or disabled, depending upon the embodiment), then devices 102*a* and 102*b* may communicate via communication path 610.

Now, assume that device 104*b* needs to communicate with device 104*c*. Since device 104*b* and device 104*c* both use the $2^{nd}$ cache-line size, controller 504 determines that the devices 104*b* and 104*c* have compatible cache-lines sizes, and enables a communication path 612 by communicating an enabling signal to port 5 and to port 6. Once port 5 and port 6 are enabled (other ports may be enabled and/or disabled, depending upon the embodiment), then devices 104*b* and 104*c* may communicate via communication path 612.

However, now assume that device 104*b* needs to communicate with device 102*c*. Since device 102*c* uses the $1^{st}$ cache-line size, and device 104*b* uses the $2^{nd}$ cache-line size, controller 504 determines that the devices 104*b* and 104*c* have incompatible cache-lines sizes, and disables a communication path 614 by communicating a disabling signal to port 5 and/or to port 3. With one or both of ports 5 and 3 disabled (other ports may be enabled and/or disabled, depending upon the embodiment), then devices 104*b* and 102*c* may not communicate.

Figure 7:
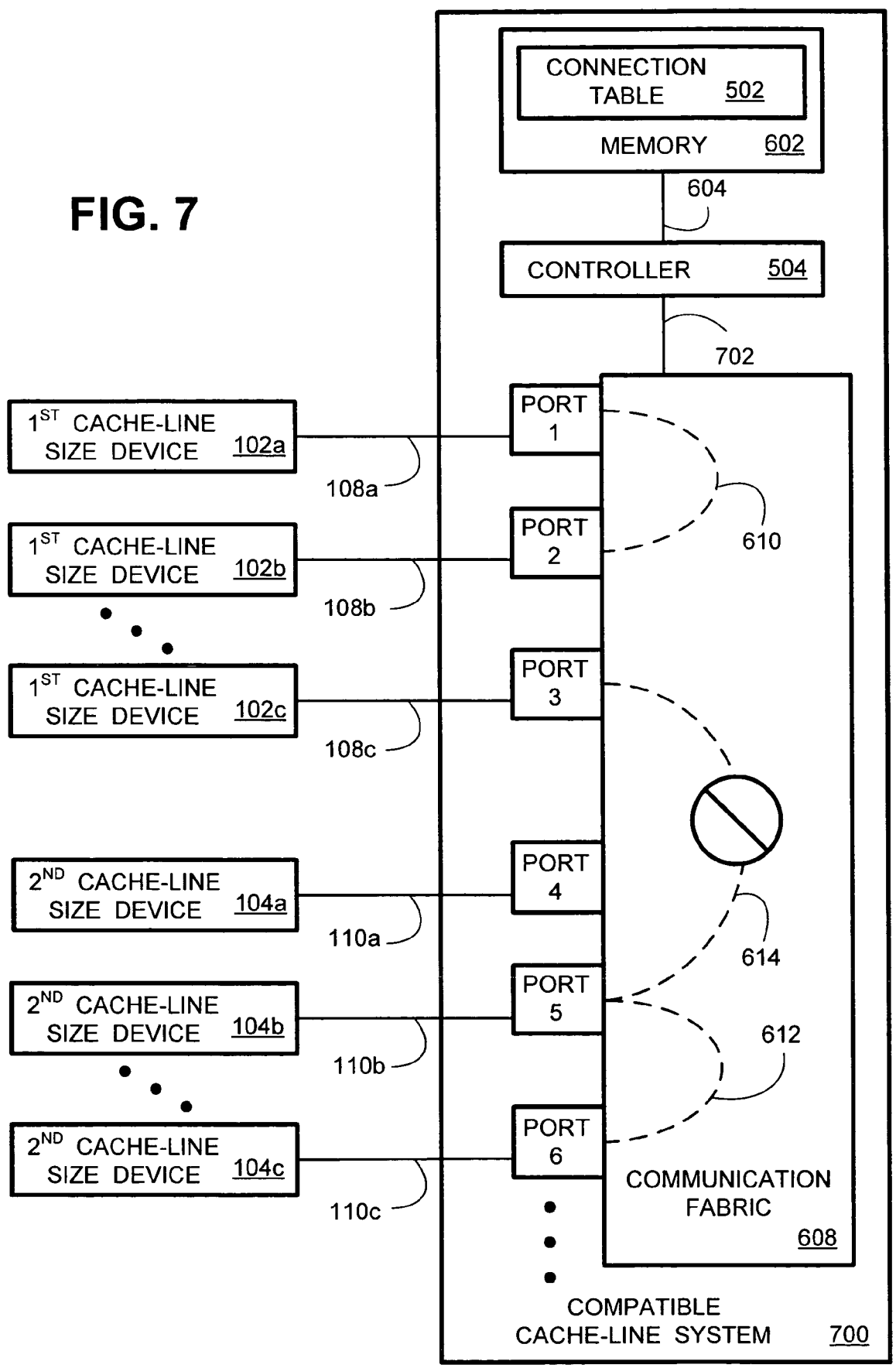
FIG. 7 is a block diagram illustrating greater detail of another embodiment of a table-based compatible cache-line system of FIG. 5.

FIG. 7 is a block diagram illustrating greater detail of another embodiment of a table-based compatible cache-line system 700. In this embodiment, controller 504 is communicatively coupled to selected elements (not shown) residing in the communication fabric 608, via connection(s) 702. The operation of the table-based compatible cache-line system 700 is very similar to the above-described operation of the table-based compatible cache-line system 600. However, rather than enabling/disabling ports, the table-based compatible cache-line system 700 enables or disables elements to which it communicates with over connection 702.

For convenience, connection table 502 (FIGS. 5–7) is illustrated as residing within the compatible cache-line communication system embodiment. In other embodiments, the connection table 502 may reside in a remote memory device that is accessible by the compatible cache-line system embodiment.

Figure 8A:
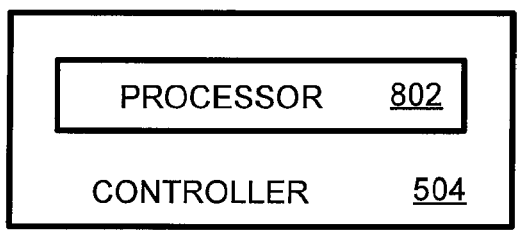
FIGS. 8A and 8B are block diagrams illustrating processor-based and state machine-based embodiments.
Figure 8B:
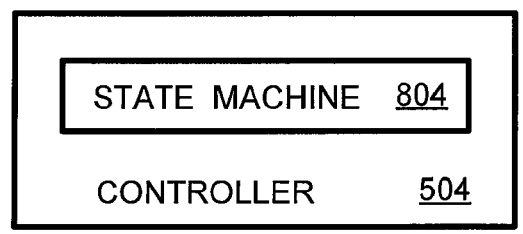

FIGS. 8A and 8B are block diagrams illustrating processor-based and state machine-based embodiments. The above-described determinations regarding cache-line sizes and identification of devices are performed by the processor 802 or the state-machine 804, depending upon the embodiment.

Figure 9:
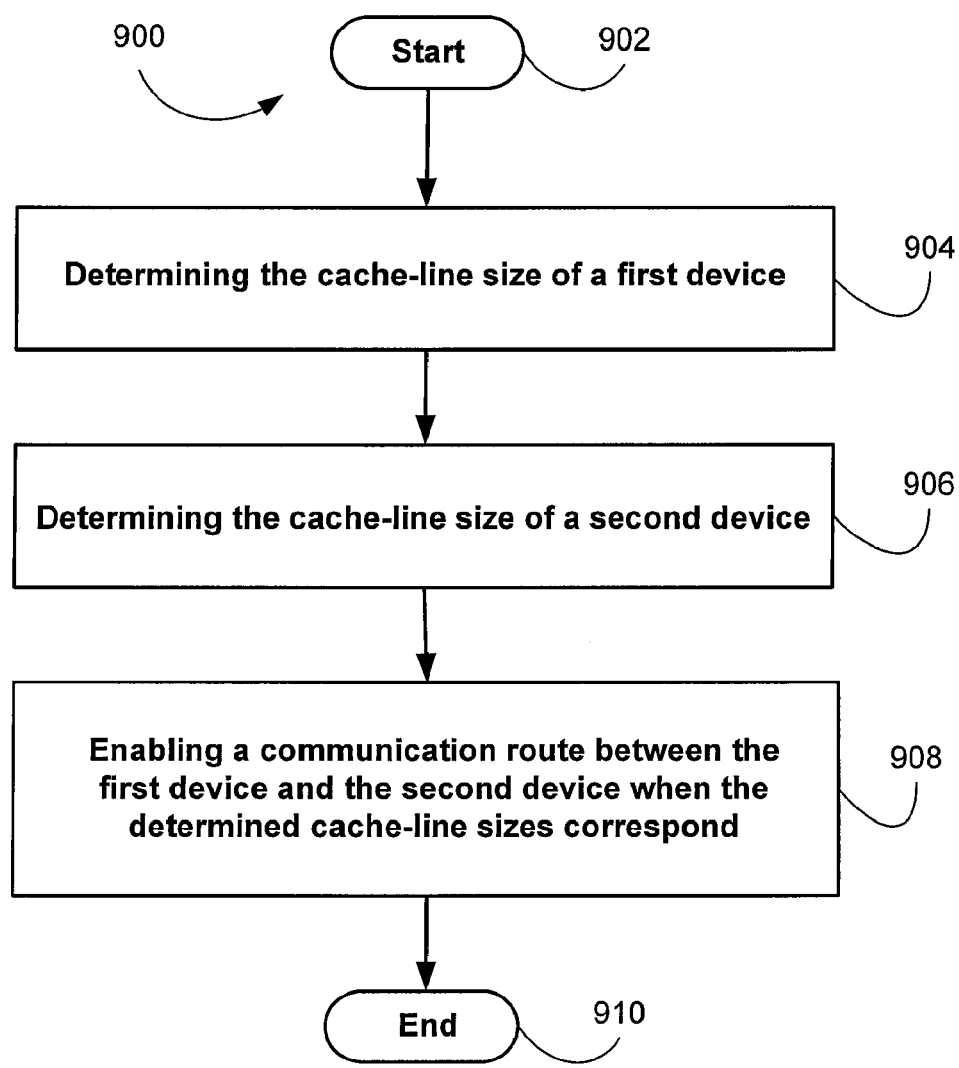
FIG. 9 shows a flow chart 900 illustrating a process used by embodiments of the compatible cache-line communication system embodiment.

FIG. 9 shows a flow chart 900 illustrating a process used by embodiments of the compatible cache-line communication system. The flow chart 900 shows the architecture, functionality, and operation of an embodiment for implementing the logic 506 (FIG. 5). An alternative embodiment implements the logic of flow chart 900 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 9, or may include additional functions. For example, two blocks shown in succession in FIG. 9 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process begins at block 902. At block 904, the cache-line size of a first device is determined. At block 906, the cache-line size of a second device is determined. At block 908, a communication route is enabled between the first device and the second device when the determined cache-line sizes correspond. At block 910, the process ends.

Embodiments of the compatible cache-line communication system implemented in memory 602 (FIGS. 6 and 7) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

In the above-described embodiments, the communication ports, connections and paths were described as "single line" elements (a one-wire or component element). However, the above-described communication ports, connections and paths were described a single-line elements for simplicity. It is appreciated that the above-described communication connections and paths may be comprised of multiple parallel elements, such as, but not limited to, physical wires. Also, a port may be comprised of multiple parallel elements, such as, but not limited to, signal pins. One exemplary type of communication port, connection and/or path system employs high-bandwidth point-to-point links. One type of link uses ten lanes per link. A lane is sometimes referred to as a serializer/deserializer (SERDES) link. Each SERDES link employs four high-speed pins to support bi-directional communications. Thus, communication connections and paths may have many individual wire elements, and a port may have many high-speed signal pins. Other types of embodiments may similarly use multiple element devices that correspond to the simplified "single-line" components illustrated and described hereinabove. All such modifications and variations are intended to be included herein within the scope of this disclosure.

Furthermore, it should be emphasized that the above-described embodiments are merely examples of the disclosed system and method. Many variations and modifications may be made to the above-described embodiments. All such modifications and variations are intended to be included herein within the scope of this disclosure.

What is claimed is:

1. A compatible cache-line communication system, comprising:
    a plurality of first ports, each first port configured to receive communications from a first type of device that uses a first cache-line size; and
    a plurality of second ports, each second port configured to receive communications from a second type of device that uses a second cache-line size, such that communications between the first type of devices are enabled over a plurality of first routes, such that communications between the second type of devices are enabled over a plurality of second routes, and such that communications between the first type of devices and the second type of devices are disabled.

2. The system of claim 1, further comprising at least one crossbar device that communicatively couples to the plurality of first ports and the plurality of second ports.

3. The system of claim 1, further comprising:
    a table having at least information identifying the cache-line size of the first type of devices and the second type of devices;
    a controller configured to determine the cache-line size used by a receiving device, wherein the receiving device is one of the first or the second type of devices, configured to determine if the cache-line size of the communication is compatible with the cache-line size of the receiving device, and configured to enable a corresponding one of the routes only if the cache-line size of the communication and the receiving device are compatible.

4. The system of claim 3, wherein the controller evaluates a header associated with the communication to determine an identity of a sending device that originated the communication.

5. The system of claim 3, wherein the controller evaluates a data associated with the communication to determine the cache-line size of the communication.

6. The system of claim 1, wherein the first routes and the second routes are predefined.

7. A method for facilitating communications between a plurality of devices that communicate using different cache-line sizes, the method comprising:
    determining the cache-line size of a first device;
    determining the cache-line size of a second device;
    enabling a communication route between the first device and the second device when the determined cache-line sizes correspond; and
    disabling the communication route between the first device and the second device when the determined cache-line sizes do not correspond.

8. The method of claim 7, further comprising:
    determining a device identity (ID) of the first device which is to receive the communication from the second device; and
    determining the cache-line size of the first device by looking up information corresponding to the device ID and the cache-line size in a table.

9. The method of claim 8, wherein determining the device ID further comprises determining the device ID from information residing in a header of a data packet.

10. The method of claim 8, further comprising:
    determining a second device ID of the communicating second device which transmits the communication to the first device; and
    determining the cache-line size of the communicating second device by looking up information corresponding to the second device ID and the cache-line size in the table.

11. The method of claim 10, wherein determining the second device ID further comprises determining the second device ID from information residing in a header of a data packet.

12. The method of claim 8, further comprising analyzing information residing in data of a data packet to determine the cache-line size of the second device.

13. The method of claim 12, wherein analyzing information further comprises analyzing cache-line information residing in the data of the data packet.

14. The method of claim 12, wherein analyzing information further comprises analyzing a format of the data of the data packet.

15. The method of claim 7, further comprising:
    determining the cache-line size of a third device;
    determining the cache-line size of a fourth device; and
    disabling a second communication route between the third device and the fourth device when the determined cache-line sizes do not correspond.

16. The method of claim 15, wherein the enabling and the disabling are predetermined.

17. The method of claim 7, wherein the enabling further comprises communicating an enabling signal.

18. The method of claim 17, wherein the communicating further comprises communicating the enabling signal to a port to which the first device is communicatively coupled to.

19. The method of claim 17, wherein the communicating further comprises communicating the enabling signal to a port to which the second device is communicatively coupled to.

20. The method of claim 17, wherein the communicating further comprises communicating the enabling signal to a component of the communication route.

21. A system for facilitating communications between a plurality of devices that communicate using different cache-line sizes, comprising:
    means for determining the cache-line size of a first device and for determining the cache-line size of a second device;
    means for enabling a communication route between the first device and the second device when the determined cache-line sizes correspond; and means for disabling the communication route between the first device and the second device when the determined cache-line sizes do not correspond.

22. A program for facilitating communications between a plurality of devices that communicate using different cache-line sizes stored on computer-readable medium, the program comprising logic configured to perform:

determining the cache-line size of a first device;
determining the cache-line size of a second device;

enabling a communication route between the first device and the second device when the determined cache-line sizes correspond; and disabling the communication route between the first device and the second device when the determined cache-line sizes do not correspond.

* * * * *